(No Model.)
W. M. MINER.
CAR LIGHTING.
No. 516,336. Patented Mar. 13, 1894.
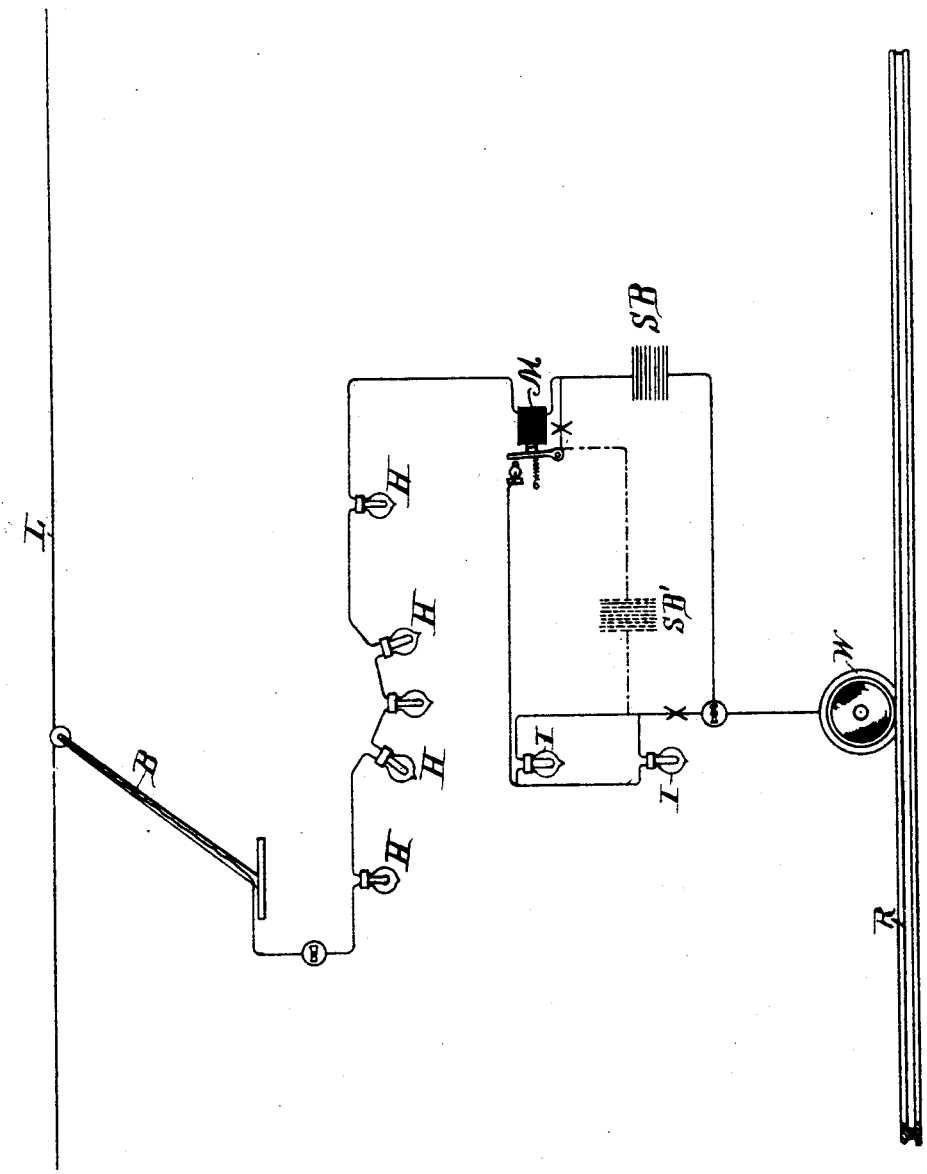
Attest:
T. F. Convey.
Wm. H. Capel.
Inventor
Willard M. Miner
By H. C. Townsend,
Attorney.

UNITED STATES PATENT OFFICE.

WILLARD M. MINER, OF PLAINFIELD, NEW JERSEY, ASSIGNOR TO THE AMERICAN MANUFACTURING AND ENGINEERING COMPANY, OF NEW YORK, N. Y.

CAR-LIGHTING.

SPECIFICATION forming part of Letters Patent No. 516,336, dated March 13, 1894.

Application filed November 7, 1893. Serial No. 490,256. (No model.)

*To all whom it may concern:*

Be it known that I, WILLARD M. MINER, a citizen of the United States, and a resident of Plainfield, in the county of Union and State of New Jersey, have invented a certain new and useful System of Car-Lighting, of which the following is a specification.

My invention relates to the electric lighting of railway cars and is designed as an improvement on those systems in which the lamps for lighting are operated in a branch from a line or supply wire exterior to the car, as is the case in the present systems of electric propulsion of cars.

The object of my invention is to provide for accidental disconnection of the branch from the supply wire which frequently arises from the trolley leaving the supply wire, as also from the accidental breakage of the lamps used for lighting said car; to which end the invention consists in the simple and effective combination of devices, hereinafter described and specified in the claims, whereby in the event of either the disconnection or breakage mentioned, a substitute means of illumination may be automatically provided.

As my invention is primarily intended for application to electric railway cars, I have illustrated the invention diagrammatically in the accompanying drawing as so applied.

L, indicates a section of line or working conductor which serves to supply current to a branch on the car, the circuit of said branch being completed as usual through the rails R, or any other return conductor in the usual or proper manner.

B, is any collecting device which moves over the conductor L, and takes up the current for use on the car. The device shown is the ordinary trolley, the conductor L, being in the case illustrated, an overhead wire, but, as will be well understood, my invention is not limited to cars propelled from overhead wires nor to any particular construction of collector.

H, indicates any number of electric lamps for lighting the car, operated by the current taken from the supply wire L, and included in the branch to the return R, by way of the wheel W, or otherwise.

In the present instance I have shown my invention as carried out in connection with incandescent lamps H, five in number, which are of proper voltage for operation from a five hundred volt circuit.

I, indicates the substitute lamps which are to be used for lighting the car in the event of the failure of lamps H, from any cause. Lamps I, may be of any desired candle power, but they are run in multiple to adapt them for operation by a small number of couples of storage battery S, B. The storage battery S, B, is normally disconnected from the substitute lamps I. In the preferred manner of carrying out my invention, the battery S, B, is charged by the current which operates the lights H, being for that purpose included, as shown, in the branch with them.

As will be seen the lamps H, in series with the battery operate to cut down the voltage proper for charging a battery having a small number of cells, and I am, therefore, enabled to use the small battery without wasteful resistance.

The connection of the battery S, B, with lamps I, is controlled by any device included in the branch with the lamps H, and responsive to the current therein. For such purpose I prefer to employ an electro-magnet, as indicated at M. The armature of said magnet M, as shown, has a switch to connect the battery to the lamps I, if the current should cease to flow in the branch including the lamps H. The armature lever of the magnet M, serves to close the circuit by contact with its back stop.

Instead of using the storage battery S, B, in a branch with the lamps and a magnet M, I might use one charged from any other source as, for instance, by a dynamo at a car station. Such a battery is indicated at S, B'. In this case connections at X, X, will be dispensed with and battery S, B, removed from the circuit of magnet M. It is preferable, however, to use a battery located like battery S, B, in the branch with the lamps so as to be charged by the current taken up from the line L.

Any number of lamps H, may be used adapted to the voltage of the line L.

The general operation of the apparatus is as follows: While the collector B, is in contact with wire L, and the lamps H, are burning, the magnet M, will be charged and its armature lever drawn up, thus breaking the connection of the battery S, B, and of the branch with the substitute lamps I. The battery S, B, will also receive a charge from the current flowing in the branch to repair any loss therein arising from operation of the lamps I, by said battery. Should the collector B, accidentally lose connection with L, it is obvious that the lamps H, will cease to burn thus leaving the car in darkness were it not for the fact that magnet M, will lose its power and its armature lever by dropping back close the circuit of the battery S, B, to lamps I, thus causing the latter to burn taking the place of lamps H until such time as the collector B, shall be restored to connection with the line L, when the lamps H, will begin to burn and the magnet M being charged will thereupon disconnect the lamps I, from the battery, S, B, or S, B'. Should at any time any lamp H, become extinguished by breakage of such lamp, thus putting out all the lamps in the branch, the magnet M, will as before lose its power and the substitute lamps I, be switched into circuit with the storage battery, thus providing a substitute illumination until the defective lamp H, may be restored. So also should the line L, lose its charge from any cause, thus putting out all the lamps H, of all the cars supplied thereby, the magnet M, of each car will operate automatically to bring the substitute lamps I, into operation.

As will be seen, by the above improved arrangement I secure the following advantages: The substitute lamps being operated in multiple and being independent normally of those which operate to light the car, it is not necessary to provide a great weight of storage battery to give high voltage, as would be the case if the battery were switched onto the series of lamps H, operated by the voltage used in propelling the car, when the trolley loses contact. As the battery in the preferred arrangement is operated in the branch with the lamps H, it is not necessary to provide a wasteful resistance to cut down the voltage to that proper for charging a small battery or to unduly increase the number of cells of battery to take up the voltage of the line supplying the lights. It will be seen further that the magnet or similar device M, responsive to current, being in the branch with the lamps H, provides not only for the accidental disconnection of the branch with the line, but also for the case of extinction of the lamps H, themselves from breakage, as well as for the failure of current in the main or trolley line itself from any cause. Moreover, there being a magnet in each of the branches from the main line each branch may take care of itself under all the conditions named without affecting other branches, whereas if the magnet were on the main or supply wire, as has heretofore been proposed, the extinction of a lamp in a single branch or the disconnection of a single branch would not be provided for.

What I claim as my invention is—

1. The combination, substantially as described, in a railway car, of a branch from the main line exterior to the car, electric lamps for lighting the car placed in series in said branch, a storage battery in the branch in series with the lamps, and means controlled by the current flowing in said branch for closing and breaking the connection between the battery and one or more substitute lamps.

2. The combination, substantially as described, on an electrically propelled car, of a branch from the trolley wire containing an electric lamp or lamps for illuminating the car, a storage battery in the car, a lamp or lamps independent of those in the branch, a controlling device included in said branch in series with the lamp or lamps for making and breaking the connection between the battery and the independent lamps, as and for the purpose described.

3. The combination, on a railway car, of a number of electric lamps in series in a branch leading from the trolley or collector to ground, a storage battery, substitute electric lamps connected in multiple to wires leading from the battery, and means controlled by the current flowing in series through the lamps in the branch for closing and breaking the connection between the battery and the said lamps in multiple.

4. The combination, substantially as described, of a number of incandescent lamps (H) placed in series in the branch from the trolley or supply wire to earth, an electromagnet in series with said lamps, one or more substitute incandescent lamps operated in multiple, a storage battery, and a switch controlled by said magnet for making and breaking the connection between the said battery and the substitute lamps.

5. The combination, substantially as described, of the number of incandescent lamps (H) placed in series in the branch from the trolley or supply wire to earth, an electromagnet in series with said lamps, two or more substitute incandescent lamps operated in multiple, a storage battery in the branch with said magnet, and a switch controlled by said magnet for making and breaking the connection between the said battery and the substitute lamps.

Signed at New York, in the county of New York and State of New York, this 19th day of October, A. D. 1893.

WILLARD M. MINER.

Witnesses:
WM. H. CAPEL,
THOS. F. CONREY.